Patented July 14, 1953

2,645,654

UNITED STATES PATENT OFFICE 2,645,654

SILOXANE-ALUMINUM COMPOSITIONS AND METHODS OF PREPARING THEM

James F. Hyde, Corning, N. Y., assignor to Dow Corning Corporation, Midland, Mich., a corporation of Michigan No Drawing. Application April 17, 1950,
Serial No. 156,491

5 Claims. (Cl. 260—448)

This invention relates to compounds of the formula $(R_2SiO_2AlCl)_2$ where R is methyl, ethyl or phenyl.

The compounds of this invention are prepared by reacting completely condensed diorganosiloxanes with aluminum chloride under substantially anhydrous conditions. Reaction takes place at temperatures ranging from 25° C. up. The proportions of reactants is not critical, however, optimum yields of the desired compounds are obtained when the molar ratio of siloxane to $AlCl_3$ is from .5 to 1 to 5 to 1.

$AlCl_3$ reacts with completely condensed diorganosiloxanes to produce cyclic compounds of the above formula together with chlorosiloxanes. The reaction may be represented by the equation $(R_2SiO)_n + AlCl_3 \rightarrow$
$ClR_2Si[OSiR_2]_xCl + (R_2SiO_2AlCl)_2$ The latter compounds are cyclic in structure. The chlorine atoms are bonded to Al atoms and the organic radicals to silicon. The silicon and aluminum atoms are linked through SiOAl linkages.

The degree of polymerization of the diorganosiloxane is not critical in this reaction. Thus, the siloxane may vary from cyclic trimer to nonflowing high molecular weight polymers. However, the siloxane should be substantially completely condensed. The molecular size distribution of the chlorosiloxane by-products will vary with the relative proportions of aluminum chloride and siloxane.

Siloxanes which are within the scope of the present invention are dimethylsiloxane, diethylsiloxane, diphenylsiloxane, phenylethylsiloxane, phenylmethylsiloxane and ethylmethylsiloxane.

The cyclic compounds of this invention are crystalline solids which are soluble in aromatic hydrocarbons. The alkyl compounds are volatile and may be purified by distillation and by crystallization from benzene. The aryl compounds are not readily distilled and are best purified by recrystallization. All of the compounds are hydrolyzed by water to give siloxanes and hydrated aluminum chlorides.

The cyclic siloxane-aluminum compounds of this invention are useful as intermediates in the preparation of waterproofing agents and may be employed as a catalyst in the formation of organosilicon chlorides.

The following examples are illustrative only.

Example 1

44.85 g. of diethylsiloxane cyclic trimer and 19.3 g. of $AlCl_3$ are mixed and warmed. Reaction began at once as shown by a rapid increase in temperature. The mixture was finally heated at 110° C. to 120° C. for 2 days. During the entire reaction, the materials were protected from atmospheric moisture.

The product was distilled and there was obtained a mixture of $Cl(C_2H_5)_2Si[OSi(C_2H_5)_2]_xCl$ where x is 1 to 4, boiling point 61° C. to 168° C. at 2 mm. and $[(C_2H_5)_2SiO_2AlCl]_2$ boiling point 184° C. to 191° C. at 1 mm. The latter crystallized upon cooling. The structure of the cyclic aluminum compound was determined by chlorine, silicon and aluminum analyses.

Example 2

A mixture of 38.6 g. of dimethylsiloxane cyclic tetramer and 23 g. of $AlCl_3$ was heated 12 hours at 110° C. to 120° C. The reaction product was distilled and after removal of chlorosiloxanes of the formula $(CH_3)_2ClSi[OSi(CH_3)_2]_xCl$ boiling point 80° C. to 153° C. at 1 mm., $[(CH_3)_2SiO_2AlCl]_2$ boiling point 165° C. to 167° C. at 4 mm. was obtained. The latter crystallized upon cooling.

Example 3

65.1 g. of phenylmethylcyclotetrasiloxane and 21.3 g. of $AlCl_3$ were mixed and warmed gently. Reaction began at once as shown by a rise of the temperature to 180° C. The mixture was then heated 12 hours at 130° C. to 140° C. The mixture was distilled and 31.7 g. of a mixture of $ClCH_3(C_6H_5)Si[OSiCH_3C_6H_5]_xCl$ boiling point 68° C. to 184° C. and 1 mm. was obtained. The residue consisted of 54.5 g. of a viscous liquid which was $[C_6H_5(CH_3)SiO_2AlCl]_2$.

That which is claimed is:

1. The method comprising reacting a completely condensed diorganosiloxane of the formula $R_2SiO$ where R is selected from the group consisting of methyl, ethyl and phenyl radicals, with aluminum chloride in amount such that the molar ratio of siloxanes to aluminum chloride ranges from .5 to 1 to 5 to 1, under substantially anhydrous condition whereby compounds of the formula $R_2ClSi[OSiR_2]_xCl$ and $[R_2SiO_2AlCl]_2$ where x is a positive integer are obtained.

2. A cyclic compound wherein the ring is composed of silicon, oxygen and aluminum atoms, having the empirical formula $[R_2SiO_2AlCl]_2$ where R is selected from the group consisting of methyl, ethyl, and phenyl radicals and in which cyclic compound the silicon and aluminum atoms are linked through SiOAl linkages, the chlorine atoms are bonded to the aluminum atoms and the organic radicals are bonded to the silicon atoms.

3. A compound in accordance with claim 2 in which each R is a methyl radical.

4. A compound in accordance with claim 2 in which each R is an ethyl radical.

5. A compound in accordance with claim 2 in which one of the R's attached to each silicon is methyl and the other R is phenyl.

JAMES F. HYDE.

References Cited in the file of this patent

UNITED STATES PATENTS

| Number | Name | Date |
|---|---|---|
| 2,371,050 | Hyde | Mar. 6, 1945 |
| 2,440,101 | Krieble | Apr. 20, 1948 |
| 2,500,761 | Lewis | Mar. 14, 1950 |